(12) United States Patent
Winner et al.

(10) Patent No.: US 7,792,110 B2
(45) Date of Patent: Sep. 7, 2010

(54) METHOD AND SYSTEM FOR UPDATING A VIRTUAL LOCAL AREA NETWORK (VLAN) STATUS OF A NODE IN A MESH NETWORK

(75) Inventors: Charles W. Winner, Sanford, FL (US);
Charles R. Barker, Orlando, FL (US);
Keith J. Goldberg, Casselberry, FL (US);
Hrishikesh Gossain, Lake Mary, FL (US)

(73) Assignee: Motorola, Inc., Schaumburg, IL (US)

( * ) Notice: Subject to any disclaimer, the term of this patent is extended or adjusted under 35 U.S.C. 154(b) by 134 days.

(21) Appl. No.: 12/059,625

(22) Filed: Mar. 31, 2008

(65) Prior Publication Data
US 2009/0245264 A1 Oct. 1, 2009

(51) Int. Cl.
*H04L 12/28* (2006.01)
(52) U.S. Cl. ..................................... 370/390
(58) Field of Classification Search ................. 370/254, 370/256, 389, 404, 390, 401, 412
See application file for complete search history.

(56) References Cited

U.S. PATENT DOCUMENTS

| 7,251,238 | B2 | 7/2007 | Joshi et al. | |
|---|---|---|---|---|
| 2005/0152289 | A1* | 7/2005 | Nagata et al. | 370/256 |
| 2006/0098612 | A1* | 5/2006 | Joshi et al. | 370/338 |
| 2008/0267090 | A1* | 10/2008 | Okita et al. | 370/254 |
| 2009/0109870 | A1* | 4/2009 | Metke et al. | 370/254 |

OTHER PUBLICATIONS

Nen-Fo Huang et al—"virtual LAN Internetworking over ATM Networks for Mobile Stations"—IEEE 1997—pp. 1397-1404.
WI-FI Alliance Technical Committee Quality of Service (QOS) Task Group, "WMM Specification Version 1.1," 2005, p. 33.
Donald Eastlake et al., "Segregated Data Services in the Mesh," IEEE 802.11-07/2161r1, Jul. 2007, pp. 1-15.

* cited by examiner

*Primary Examiner*—Dang T Ton
*Assistant Examiner*—Nourali Mansoury
(74) *Attorney, Agent, or Firm*—Randi L. Karpinia

(57) ABSTRACT

A method for updating at a bridge node a virtual local area network (VLAN) status of a first node in a mesh network as provided enables improved network connectivity. The method includes processing a first VLAN status message that associates a first VLAN identifier with the first node, wherein the first VLAN status message was generated in response to a first bind request (BREQ) message. A second VLAN status message is then transmitted, wherein the second VLAN status message associates the first VLAN identifier with the first node. A third VLAN status message that associates a second VLAN identifier with the first node is then processed, wherein the third VLAN status message was generated in response to a second bind request (BREQ) message that associated the second VLAN identifier with the first node, and whereby the VLAN status of the first node is updated.

20 Claims, 7 Drawing Sheets

FIG. 4

TEST FRAME WITH VLAN TAG

| OCTETS | DESTINATION | SOURCE | 81-00 | VLAN TAG | LENGTH | DSAP | SSAP | CTL | XID |
|---|---|---|---|---|---|---|---|---|---|
| | 6 | 6 | 2 | 2 | 2 | 1 | 1 | 1 | 3 |
| | 405 | 410 | 415 | 420 | 425 | 430 | 435 | 440 | 445 |

FIG. 5

MESH NULL FRAME

| OCTETS | DESTINATION | SOURCE | 81-00 | VLAN TAG | 88-A9 | VERSION | C |
|---|---|---|---|---|---|---|---|
| | 6 | 6 | 2 | 2 | 2 | 1 | 1 |
| | 505 | 510 | 515 | 520 | 525 | 530 | 535 |

| OCTETS | DESTINATION | SOURCE | 81-00 | VLAN TAG | 88-A9 | VERSION | 3 | BANN/BRED |
|---|---|---|---|---|---|---|---|---|
| | 6 | 6 | 2 | 2 | 2 | 1 | 1 | |

BANN/BRED WITH VLAN TAG

*FIG. 7*

METHOD AND SYSTEM FOR UPDATING A VIRTUAL LOCAL AREA NETWORK (VLAN) STATUS OF A NODE IN A MESH NETWORK

FIELD OF THE DISCLOSURE

The present invention relates generally to wireless communication networks, and in particular to virtual local area networks that employ mesh network technology.

BACKGROUND

Virtual Local Area Networks (VLANs) generally include many of the same attributes of physical Local Area Networks (LANs), except that VLANs enable network nodes to be grouped together even when the nodes are operating in seemingly disparate and often physically separated networks. Thus reconfiguration of VLANs often can be accomplished using software, and requires little or no reconfiguration of network hardware.

However, manipulating VLANs and providing connectivity services in a wireless mesh network can be more challenging than providing similar services in a wired network. Wireless mesh networks, such as Mobile Ad Hoc Networks (MANETs), are based on self-configuring autonomous collections of portable devices that communicate with each other over wireless links having limited bandwidths. A mesh network is a collection of wireless nodes or devices organized in a decentralized manner to provide range extension by allowing nodes to be reached across multiple hops. In a mesh network, communication packets sent by a source node thus can be relayed through one or more intermediary nodes before reaching a destination node. Mesh networks may be deployed as temporary packet radio networks that do not involve significant, if any, supporting infrastructure. Rather than employing fixed base stations, in some mesh networks each user node can operate as a router for other user nodes, thus enabling expanded network coverage that can be set up quickly, at low cost, and which is highly fault tolerant. In some mesh networks, special wireless routers also may be used as intermediary infrastructure nodes. Large networks thus can be realized using intelligent access points (IAPs), also known as gateways or portals, which provide wireless nodes with access to a wired backhaul or wide area network (WAN).

Because a mesh network may dynamically reconfigure itself in response to wireless nodes moving within the network, managing VLANs and related network services can be difficult. For example, if a mobile station joins a VLAN via a first mesh access point in a mesh network in order to receive a data stream, such as a video data stream, but then transfers its communication connection from the first mesh access point to a second mesh access point, the data stream may continue to be forwarded to the first mesh access point, even if the first mesh access point no longer has any members receiving the data stream. Thus valuable network resources can be wasted on transmitting VLAN traffic to network segments that are not presently connected to any VLAN group members.

Accordingly, there is a need for an improved method and system for updating a VLAN status of a node in a mesh network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 is a block diagram illustrating an open systems interface (OSI) level 2 test frame, according to some embodiments of the present invention.

FIG. 5 is a block diagram illustrating a mesh null frame, according to some embodiments of the present invention.

FIG. 7 is a block diagram illustrating fields of a message that can be used as either a binding announcement (BANN) or a binding removed (BRED) message, according to some embodiments of the present invention.

Figure 1:
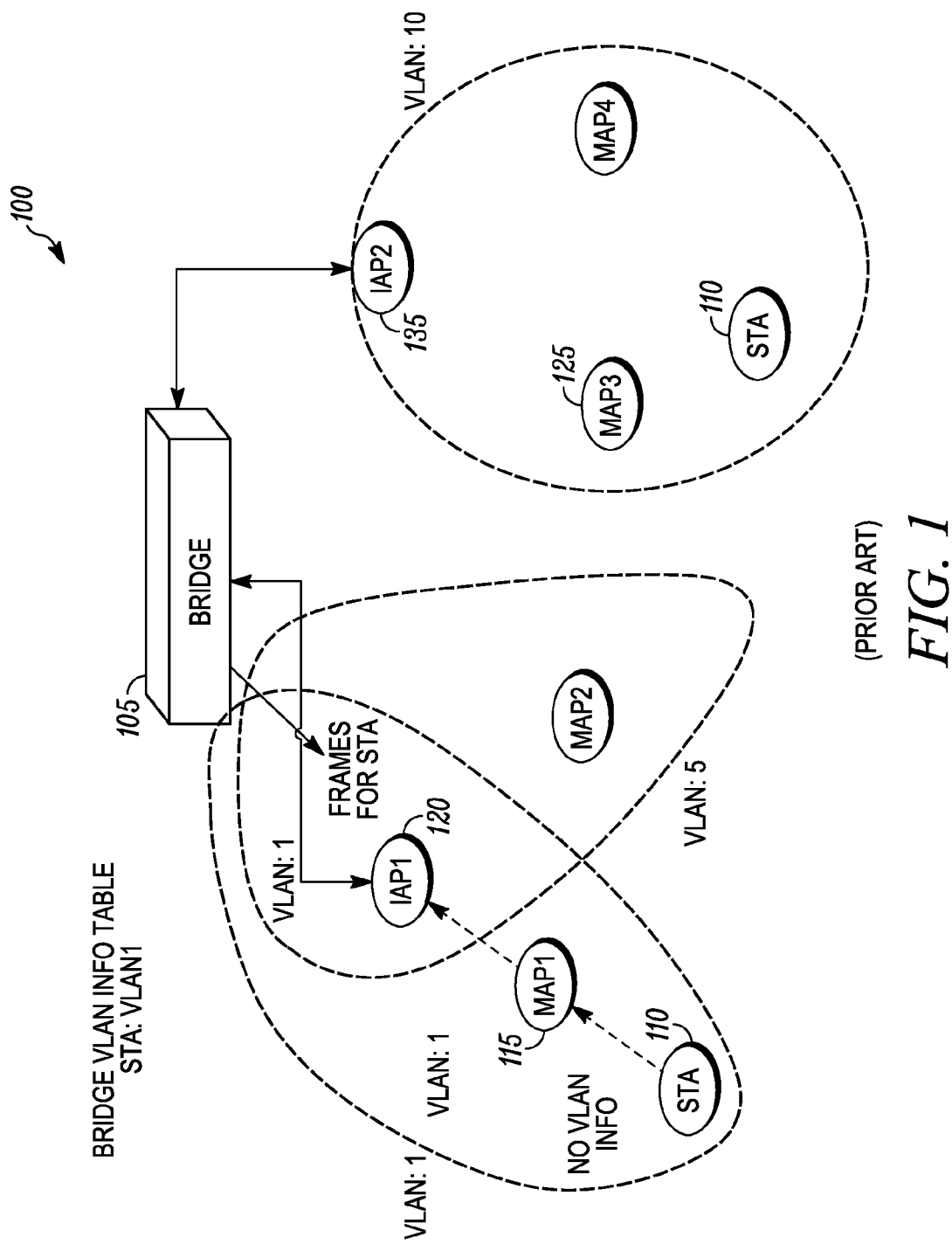
FIG. 1 is a diagram illustrating a bridge node that is operatively connected to multiple virtual local area networks (VLANs) in a mesh network, according to the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments, the present invention is a method for updating at a bridge node a virtual local area network (VLAN) status of a first node in a mesh network. The method includes processing at the bridge node in the mesh network a first VLAN status message that associates a first VLAN identifier with the first node. The first VLAN status message is generated in response to a first bind request (BREQ) message that associated the first VLAN identifier with the first node. A second VLAN status message is then transmitted from the bridge node, where the second VLAN status message associates the first VLAN identifier with the first node. The bridge node then processes a third VLAN status message that associates a second VLAN identifier with the first node. The third VLAN status message is generated in response to a second bind request (BREQ) message that associated the second VLAN identifier with the first node. The VLAN status of the first node is thus updated at the bridge node.

According to the method described above, some embodiments of the present invention enable prompt updating of a VLAN status of a network device when a configuration of a mesh network changes. Messages and data streams therefore can be promptly redirected so they are sent to only relevant VLAN group members. That can substantially reduce occurrences where data packets are forwarded to "old" mesh access points, to which the VLAN group members are no longer connected, or where data packets are forwarded to a VLAN where an addressee node is not a member. Overall network resources therefore can be conserved, and a network operating efficiency can be improved, and network service disruptions can be reduced.

Referring to FIG. 1, a diagram illustrates a bridge node 105 that is operatively connected to multiple virtual local area networks (VLANs) in a mesh network 100, according to the prior art. Consider that a station (STA) 110 is wirelessly connected to a first mesh access point (MAP1) 115 that is operating as part of a first VLAN (VLAN:1), and the MAP1 115 is operatively connected to the bridge node 105 via a first intelligent access point (IAP1) 120. An information table maintained by the bridge node 105 therefore indicates that the STA 110 is part of the VLAN:1. Further, consider that the STA 110 then moves and connects with another MAP (MAP3) 125. The MAP3 125 is operating as part of another VLAN (VLAN:10), and is operatively connected to the bridge 100 via a second intelligent access point (IAP2) 135.

According to the teachings of the prior art, the information table maintained by the bridge node 105 will not be immediately updated when the STA 110 moves from the VLAN:1 to the VLAN:10. Rather, until data frames have been exchanged through the MAP3 125 between the STA 110 and the bridge node 105, the bridge node 105 will continue to forward frames designated for the STA 110 to the IAP1 120 in the VLAN:1. That results in incorrect delivery of data, loss of service, and an unnecessary use of network resources.

Figure 2:
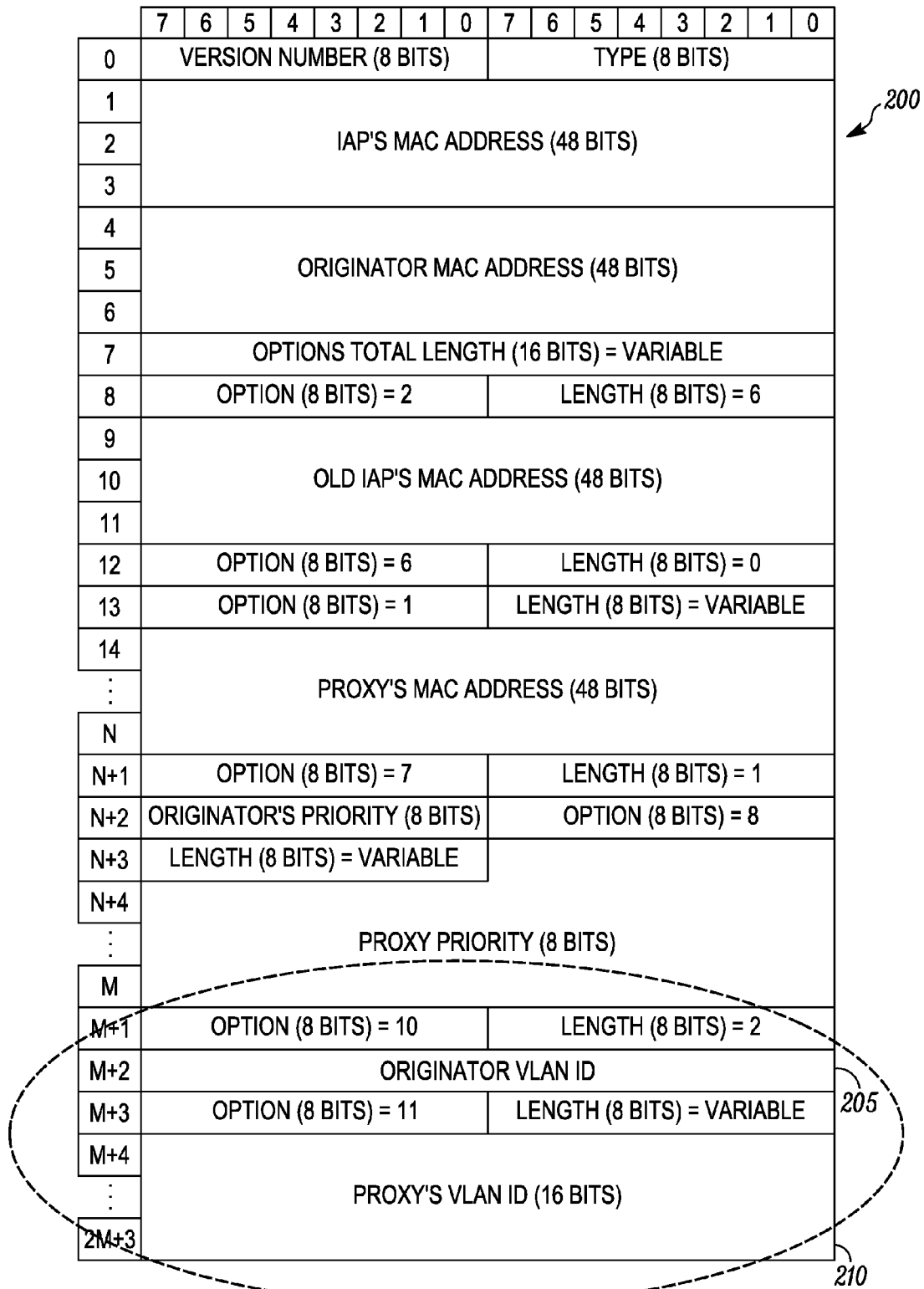
FIG. 2 is a block diagram illustrating contents of a bind request (BREQ) message that can be used to update at a bridge node a VLAN status of a first node in a mesh network, according to some embodiments of the present invention.

Referring to FIG. 2, a block diagram illustrates contents of a bind request (BREQ) message 200 that can be used to update at a bridge node a VLAN status of a first node in a mesh network, according to some embodiments of the present invention. The BREQ message 200 is a unicast message that is generated by a network device to enable the device to become bound or re-bound with an intelligent access point (IAP). The BREQ message 200 thus can be transmitted, for example, in the following circumstances: after a device powers up and establishes a route to an IAP; after an IAP binding sub-module is instructed to bind to a new IAP due to changes in a route or routing metrics; after a change is made in a local proxy table of a network device due to an addition or deletion of entries (e.g., when a new STA is associated with the network device); or on a periodic basis to refresh a binding table at an IAP.

The BREQ message 200 includes an originator VLAN identification (ID) field 205 that includes a VLAN identifier of an originator routable device, and a proxy's VLAN ID field 210 that includes a VLAN identifier for all network nodes proxied by an originating mesh node. As described in detail below, the BREQ 200 enables VLAN information about non-routable network devices (such as stations (STAs)) and about routable network devices (such as mesh points (MPs)) to be proactively updated at a bridge node in a multi-hop mesh network.

The use of BREQ messages as known by those having ordinary skill in the art is described in U.S. Pat. No. 7,251, 238, titled "System and Method for Routing Data Between Different Types of Nodes in a Wireless Network", by Joshi, et al., issued Jul. 31, 2007, and herein incorporated by reference in its entirety. For example, a BREQ may include the following information: a Bound Intelligent Access Point (IAP) Address (such as a Medium Access Control (MAC) address, Internet Protocol (IP) address or other device identification (ID); an Originator MAC Address (such as an address of an access point or other meshed device, which address may be a MAC address, IP address or other device ID); and a List of Devices associated with an originator meshed device; and an Old Bound IAP MAC Address (such as a MAC address, IP address or other device ID.

Figure 3:
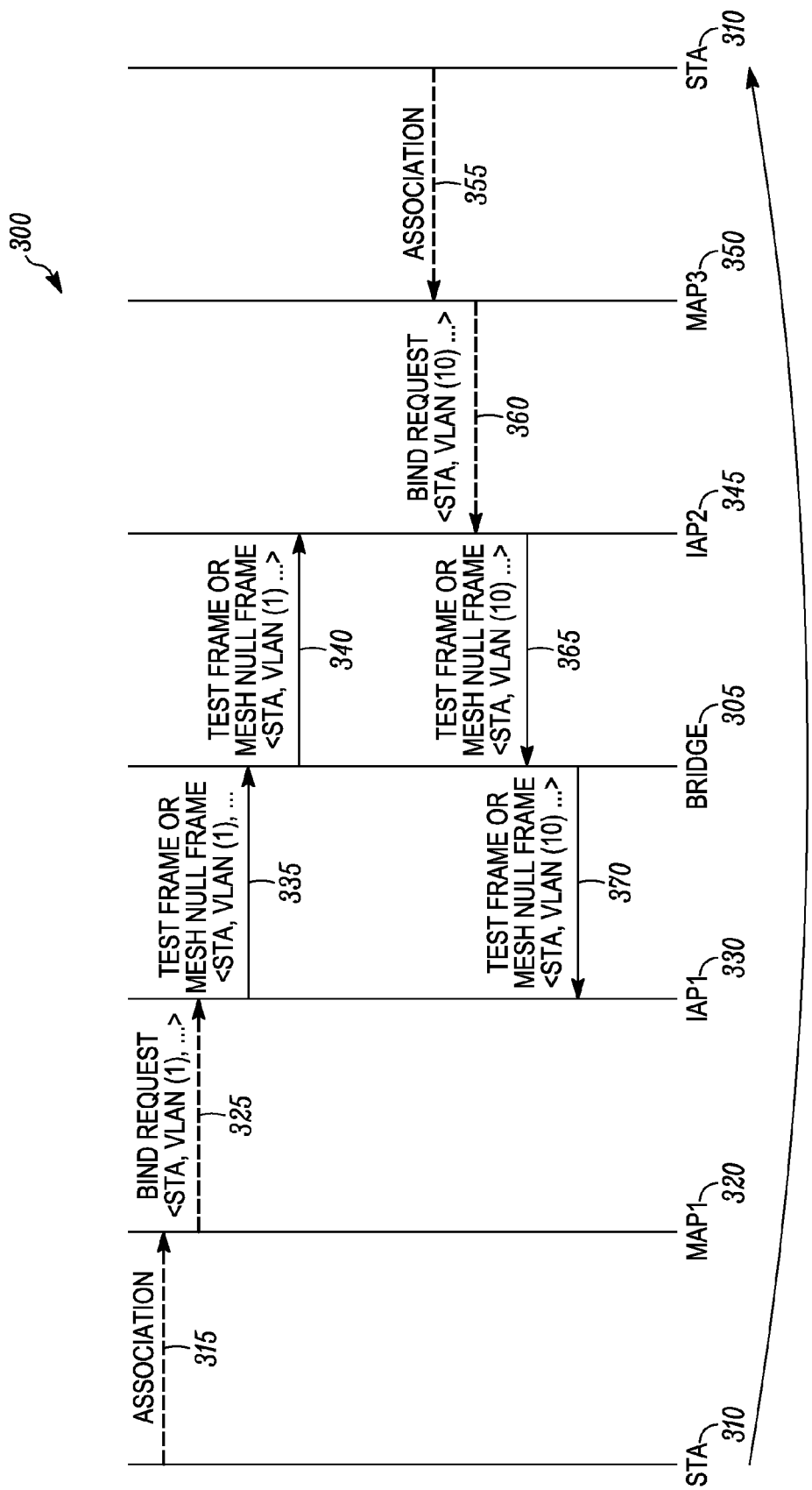
FIG. 3 is a message sequence chart illustrating a method for updating at a bridge node a VLAN status of a station (STA) in a mesh network, according to some embodiments of the present invention.

Referring to FIG. 3, a message sequence chart illustrates a method for updating at a bridge node 305 a VLAN status of a STA 310 in a mesh network 300, according to some embodiments of the present invention. An association message 315 is first transmitted from the STA 310 to a first mesh access point (MAP1) 320. The MAP1 320 then transmits a BREQ message 325 to a first intelligent access point (IAP1) 330. The BREQ message 325 indicates that the STA 310 is presently associated with a first VLAN (i.e., VLAN(1)). A message 335 including a test frame or a mesh null frame is then broadcast from the IAP1 330, on behalf of the MAP1 320, to the bridge node 305. The bridge node 305 then re-broadcasts a message 340, which also includes a test frame or a mesh null frame, to all IAPs to which the bridge node 305 is connected, including to a second IAP (IAP2) 345. The test frame or mesh null frame is generated by an IAP on behalf of a non meshing network device to update VLAN and medium access control (MAC) address entries in backhaul bridges or switches. Such frames are described in further detail below.

Next, consider that the STA 310 moves away from the MAP1 320 and into radio frequency communication with a MAP3 350 that is operatively connected to the IAP2 345 and is a member of another VLAN (VLAN(10)). The STA 310 therefore transmits another association message 355 to the MAP3 350, and the MAP3 350 responds by transmitting a BREQ message 360 to the IAP2 345. The BREQ message 360 indicates that the STA 310 is now associated with the VLAN(10). The IAP2 345 then broadcasts, on behalf of the STA 310, a message 365, including a test frame or a mesh null frame, to the bridge 305. The bridge 305 is then able to update a status of the STA 310 to indicate that the STA 310 is now associated with the VLAN(10). Finally, the bridge node 305 re-transmits a message 370, including a test frame or a mesh null frame, to the IAP1 330.

Referring to FIG. 4, a block diagram illustrates an open systems interface (OSI) level 2 test frame 400, such as may be included in the messages 335, 340, 365, 370, according to some embodiments of the present invention. The test frame 400 thus can be generated by an IAP on behalf of a non-meshed device in order to update VLAN and MAC address entries in backhaul bridges or switches. The test frame 400 is based on a standard test frame according to the Institute of Electrical and Electronics Engineers (IEEE) standard 802.2. (See: http://standards.ieee.org/getieee802/index.html or contact the IEEE at IEEE, 445 Hoes Lane, PO Box 1331, Piscataway, N.J. 08855-1331, USA.) A destination field 405 includes a medium access control (MAC) address of an intended message recipient, a source field 410 includes a MAC address of a sender, an 81-00 field 415 includes an ethertype that identifies an IEEE 802.1p tag, a VLAN tag field 420 includes IEEE 802.1p formatted content that identifies a VLAN identification and priority, a length field 425 includes a length of the test frame 400, a destination service access point (DSAP) field 430, a source service access point (SSAP) field 435, a control (CTL) bit field 440, and an identification (XID) field 445.

Any IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA.

Referring to FIG. 5, a block diagram illustrates a mesh null frame 500, such as may be included in the messages 335, 340, 365, 370, according to some embodiments of the present invention. The mesh null frame 500 generally includes only a mesh header and does not carry other payload or header information. The mesh null frame 500 thus can be generated by an IAP on behalf of a non-meshed device in order to update VLAN and MAC address entries in backhaul bridges or switches. A destination field 505 includes a medium access control (MAC) address of an intended message recipient, a source field 510 includes a MAC address of a sender, an 81-00 field 515 includes an ethertype that identifies an IEEE 802.1p tag, a VLAN tag field 520 includes IEEE 802.1p formatted content that identifies a VLAN identification and priority, an 88-A9 field 525 includes an ethertype that identifies a mesh protocol packet, a version field 530 identifies a version number of a mesh protocol to be used, and a C field 535 includes a protocol identification of a NULL mesh frame.

Figure 6:
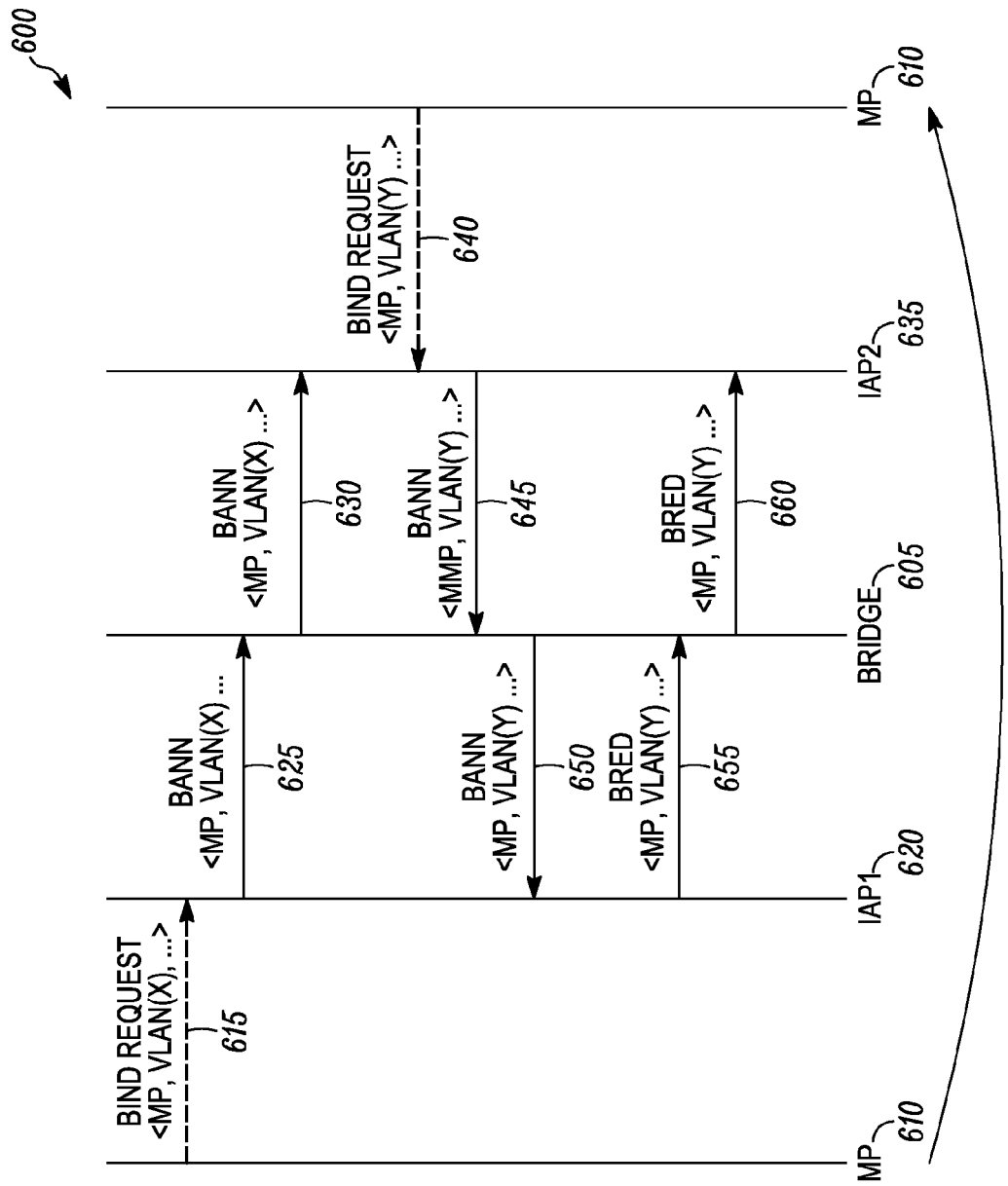
FIG. 6 is a message sequence chart illustrating a method for updating at a bridge node a VLAN status of a mesh point (MP) in a mesh network, according to some embodiments of the present invention.

Referring to FIG. 6, a message sequence chart illustrates a method for updating at a bridge node 605 a VLAN status of a mesh point (MP) 610 in a mesh network 600, according to some embodiments of the present invention. A BREQ message 615 is transmitted from the MP 610 to a first intelligent access point (IAP1) 620. The BREQ message 615 indicates that the MP 610 is presently associated with a first VLAN (i.e., VLAN(X)). The IAP1 620 then broadcasts, on behalf of the MP 610, a bind announcement (BANN) message 625 to the bridge node 605. BANN messages are described in further detail below, and are generally broadcast messages sent by an IAP to indicate an association of a network device. The BANN message 625 thus indicates that the MP 610 is associated with the VLAN(X). In response, the bridge node 605 re-broadcasts a corresponding BANN message 630 to an IAP2 635.

Next, consider that the MP 610 moves away from the IAP1 620 and to within radio frequency range of the IAP2 635, which is associated with another VLAN (i.e., VLAN(Y)). The MP 610 therefore transmits a BREQ message 640, which indicates that the MP 610 is now associated with the VLAN (Y), to the IAP2 635. The IAP2 635 then broadcasts, on behalf of the MP 610, a BANN message 645 to the bridge node 605, and the bridge node 605 re-broadcasts a BANN message 650 to the IAP1 620.

In response to the BANN message 650, the IAP1 620 unicasts a binding removed (BRED) message 655 destined for the IAP2 635 back to the bridge node 605. The BRED message 660 is then forwarded to the IAP2 635. A VLAN status of the MP 610 is thus updated at the bridge node 605.

Referring to FIG. 7, a block diagram illustrates fields of a message 700 that can be used as either a BANN or a BRED message, according to some embodiments of the present invention. When used as a BANN message, the message 700 is broadcast by an IAP in response to a received BREQ message and uses a source address of a network device that sent the BREQ message. When used as a BRED message, the message 700 is unicast from an "old" IAP to a "new" IAP and confirms a VLAN status of a network device. If the "old" IAP address in a BANN message is the address of a receiving IAP, then the IAP changes the status of an originator network device and all its proxies from "bound" to "unbound", and unicasts a BRED message to the "new" IAP.

Figure 8:
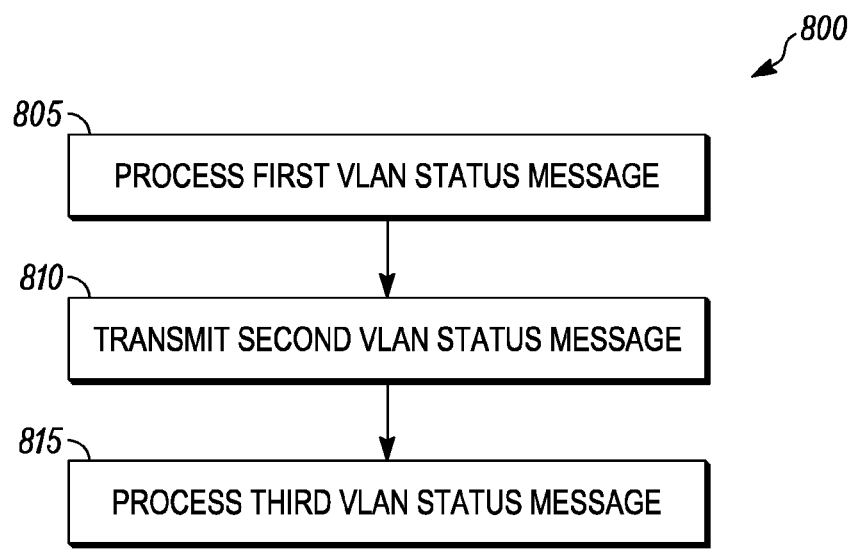
FIG. 8 is a general flow diagram illustrating a method for updating at a bridge node a virtual local area network (VLAN) status of a first node in a mesh network, according to some embodiments of the present invention.

Referring to FIG. 8, a general flow diagram illustrates a method 800 for updating at a bridge node a virtual local area network (VLAN) status of a first node in a mesh network, according to some embodiments of the present invention. At step 805, a first VLAN status message that associates a first VLAN identifier with the first node is processed at the bridge node in the mesh network, where the first VLAN status message was generated in response to a first bind request (BREQ) message that associated the first VLAN identifier with the first node. For example, the first VLAN status message can be the message 335, which is a test frame or a mesh null frame, or the BANN message 625 that are processed at the bridge node 305 or the bridge node 605, respectively.

At step 810, a second VLAN status message is transmitted from the bridge node, where the second VLAN status message associates the first VLAN identifier with the first node. For example, the second VLAN status message can be the message 340, which is a test frame or a mesh null frame, or the BANN message 630 that are transmitted from the bridge node 305 or the bridge node 605, respectively.

At step 815, a third VLAN status message that associates a second VLAN identifier with the first node is processed at the bridge node, where the third VLAN status message was generated in response to a second bind request (BREQ) message that associated the second VLAN identifier with the first node, and whereby the VLAN status of the first node is updated. For example, the third VLAN status message can be the message 365, which is a test frame or a mesh null frame, or the BANN message 645 that are processed at the bridge node 305 or the bridge node 605, respectively.

Figure 9:
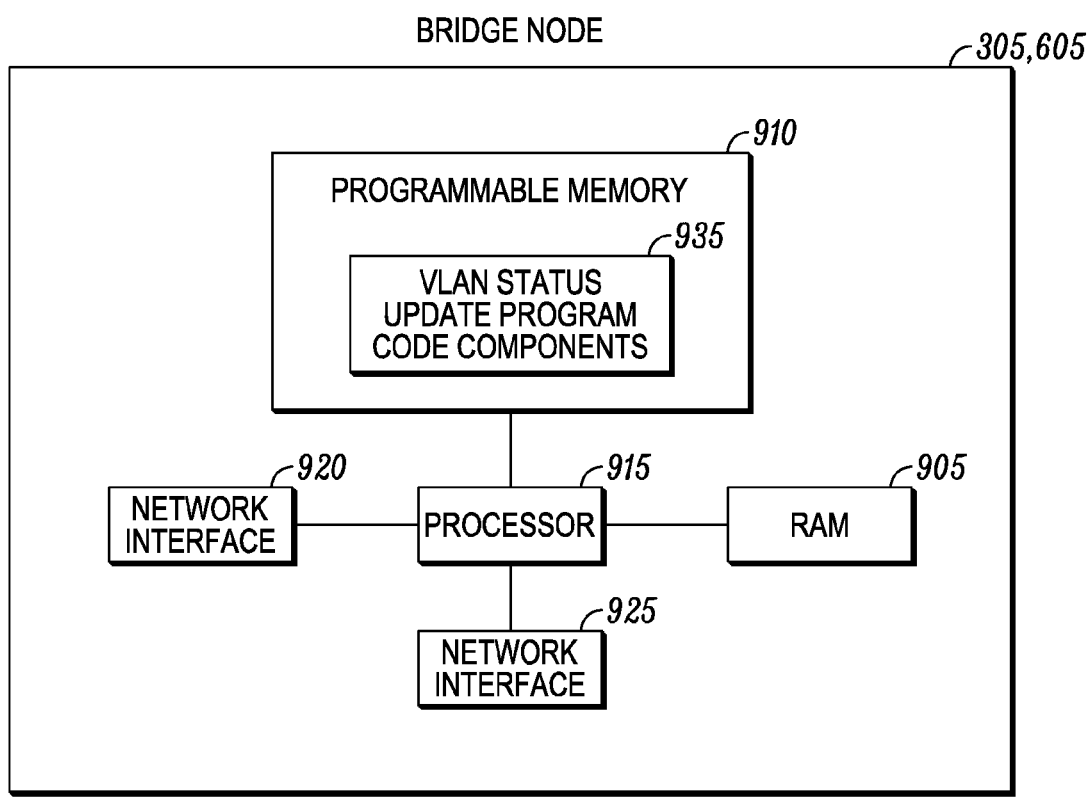
FIG. 9 is a block diagram illustrating components of a bridge node, according to some embodiments of the present invention.

Referring to FIG. 9, a block diagram illustrates components of the bridge nodes 305, 605, according to some embodiments of the present invention. The bridge nodes 305, 605 comprise a random access memory (RAM) 905 and a programmable memory 910 that are coupled to a processor 915. The processor 915 also has ports for coupling to wireless network interfaces 920, 925. The wireless network interfaces 920, 925 can be used to enable the bridge nodes 305, 605 to communicate with neighboring network nodes a mesh network. For example, the bridge node 305 can communicate with the IAP1 330 and the IAP2 345 using the wireless network interface 920 to receive and route data packets.

The programmable memory 910 can store operating code (OC) for the processor 915 and code for performing functions associated with bridge node. For example, the programmable memory 910 can comprise VLAN status updating computer readable program code components 930 configured to cause execution of the method 800 for updating a VLAN status of a node in a mesh network as described herein.

Advantages of some embodiments of the present invention therefore include enabling prompt updating of a VLAN status of a network device when a configuration of a mesh network changes. For example, network devices associated with a particular VLAN, such as mobile telephones in moving vehicles, can continuously receive data streams associated with the VLAN while roaming across multiple mesh access points in a mesh network, and the mesh network will perform prompt updates of the VLAN statuses of the devices. The data streams thus can be promptly redirected so they are sent to only relevant VLAN group members. That can substantially reduce occurrences where data streams are forwarded to "old" mesh access points, to which the VLAN group members are no longer connected, or where data packets are forwarded to a VLAN where an addressee node is not a member. Overall network resources therefore can be conserved, a network operating efficiency can be improved, and network service disruptions can be reduced.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for updating at a bridge node a virtual local area network (VLAN) status of a first node in a mesh network, the method comprising:

processing at the bridge node in the mesh network a first VLAN status message that associates a first VLAN identifier with the first node, wherein the first VLAN status message was generated in response to a first bind request (BREQ) message indicating that the first node is presently associated with a first VLAN;

transmitting from the bridge node a second VLAN status message, wherein the second VLAN status message associates the first VLAN identifier with the first node; and processing at the bridge node a third VLAN status message that associates a second VLAN identifier with the first node, wherein the third VLAN status message was generated in response to a second bind request (BREQ) message indicating that the first node is now associated with a second VLAN, and whereby the VLAN status of the first node is updated.

2. The method of claim 1, further comprising transmitting from the bridge node a fourth VLAN status message, wherein the fourth VLAN status message associates the second VLAN identifier with the first node.

3. The method of claim 1, wherein the fourth VLAN status message is a bind announcement (BANN) message, a test frame, or a mesh null frame that is transmitted to a first intelligent access point (IAP) that generated the first VLAN status message.

4. The method of claim 1, further comprising:

processing at the bridge node a first binding removed (BRED) message received from a first intelligent access point (IAP) that generated the first VLAN status message; and transmitting a second BRED message from the bridge node to a second intelligent access point (IAP) that generated the third VLAN status message, wherein both the first BRED message and the second BRED message associate the second VLAN identifier with the first node.

5. The method of claim 1, wherein the first VLAN status message comprises a bind announcement (BANN) message, a test frame, or a mesh null frame.

6. The method of claim 1, wherein the second VLAN status message comprises a bind announcement (BANN) message, a test frame, or a mesh null frame.

7. The method of claim 1, wherein the third VLAN status message comprises a bind announcement (BANN) message, a test frame, or a mesh null frame.

8. The method of claim 1, wherein the first VLAN status message was generated at a first intelligent access point (IAP) and the third VLAN status message was generated at a second IAP.

9. The method of claim 1, wherein the first node is a routable device.

10. The method of claim 1, wherein the first node is a non-routable device.

11. The method of claim 1, wherein the first node is a station (STA) or a mesh point (MP).

12. A bridge node in a mesh network, comprising:
   a computer readable medium being a non-transitory signal having computer readable program code components for processing at the bridge node in the mesh network a first VLAN status message that associates a first VLAN identifier with a first node, wherein the first VLAN status message was generated in response to a first bind request (BREQ) message indicating that the first node is presently associated with a first VLAN;
   a computer readable medium being a non-transitory signal having computer readable program code components for transmitting from the bridge node a second VLAN status message, wherein the second VLAN status message associates the first VLAN identifier with the first node; and
   a computer readable medium being a non-transitory signal having computer readable program code components for processing at the bridge node a third VLAN status message that associates a second VLAN identifier with the first node, wherein the third VLAN status message was generated in response to a second bind request (BREQ) message indicating that the first node is presently associated with a second VLAN, and whereby the VLAN status of the first node is updated.

13. The bridge node of claim 12, further comprising a computer readable medium being a non-transitory signal having computer readable program code components for transmitting from the bridge node a fourth VLAN status message, wherein the fourth VLAN status message associates the second VLAN identifier with the first node.

14. The bridge node of claim 13, wherein the fourth VLAN status message is a bind announcement (BANN) message, a test frame, or a mesh null frame that is transmitted to a first intelligent access point (IAP) that generated the first VLAN status message.

15. The bridge node of claim 12, further comprising:
   a computer readable medium being a non-transitory signal having computer readable program code components for processing at the bridge node a first binding removed (BRED) message received from a first intelligent access point (IAP) that generated the first VLAN status message; and
   a computer readable medium being a non-transitory signal having computer readable program code components for transmitting a second BRED message from the bridge node to a second intelligent access point (IAP) that generated the third VLAN status message, wherein both the first BRED message and the second BRED message associate the second VLAN identifier with the first node.

16. The bridge node of claim 12, wherein the first VLAN status message comprises a bind announcement (BANN) message, a test frame, or a mesh null frame.

17. The bridge node of claim 12, wherein the second VLAN status message comprises a bind announcement (BANN) message, a test frame, or a mesh null frame.

18. The bridge node of claim 12, wherein the third VLAN status message comprises a bind announcement (BANN) message, a test frame, or a mesh null frame.

19. The bridge node of claim 12, wherein the first VLAN status message was generated at a first intelligent access point (IAP) and the third VLAN status message was generated at a second IAP.

20. A bridge node in a mesh network, comprising:
   means for processing at the bridge node in the mesh network a first VLAN status message that associates a first VLAN identifier with a first node, wherein the first VLAN status message was generated in response to a first bind request (BREQ) message indicating that the first node is presently associated with a first VLAN;
   means for transmitting from the bridge node a second VLAN status message, wherein the second VLAN status message associates the first VLAN identifier with the first node; and
   means for processing at the bridge node a third VLAN status message that associates a second VLAN identifier with the first node, wherein the third VLAN status message was generated in response to a second bind request (BREQ) message indicating that the first node is now associated with a second VLAN, and whereby the VLAN status of the first node is updated.

* * * * *